G. WOODS.
REED-ORGAN ACTIONS.

No. 190,698.  Patented May 15, 1877.

Witnesses:
Henry Chadbourn.
Gordon H. Nott.

Inventor:
George Woods.
by Alban Andrén
his atty.

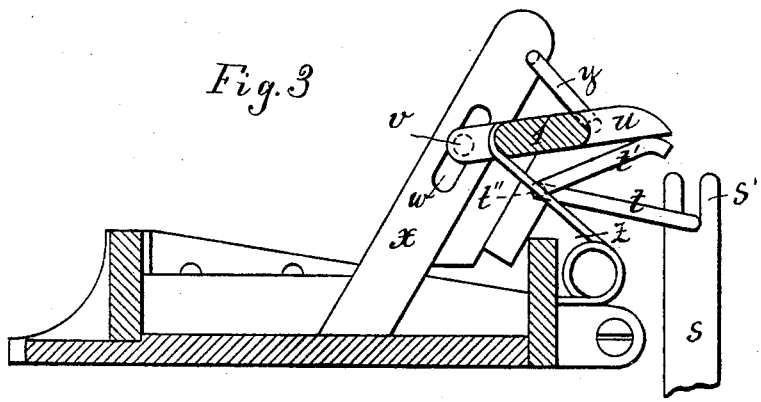
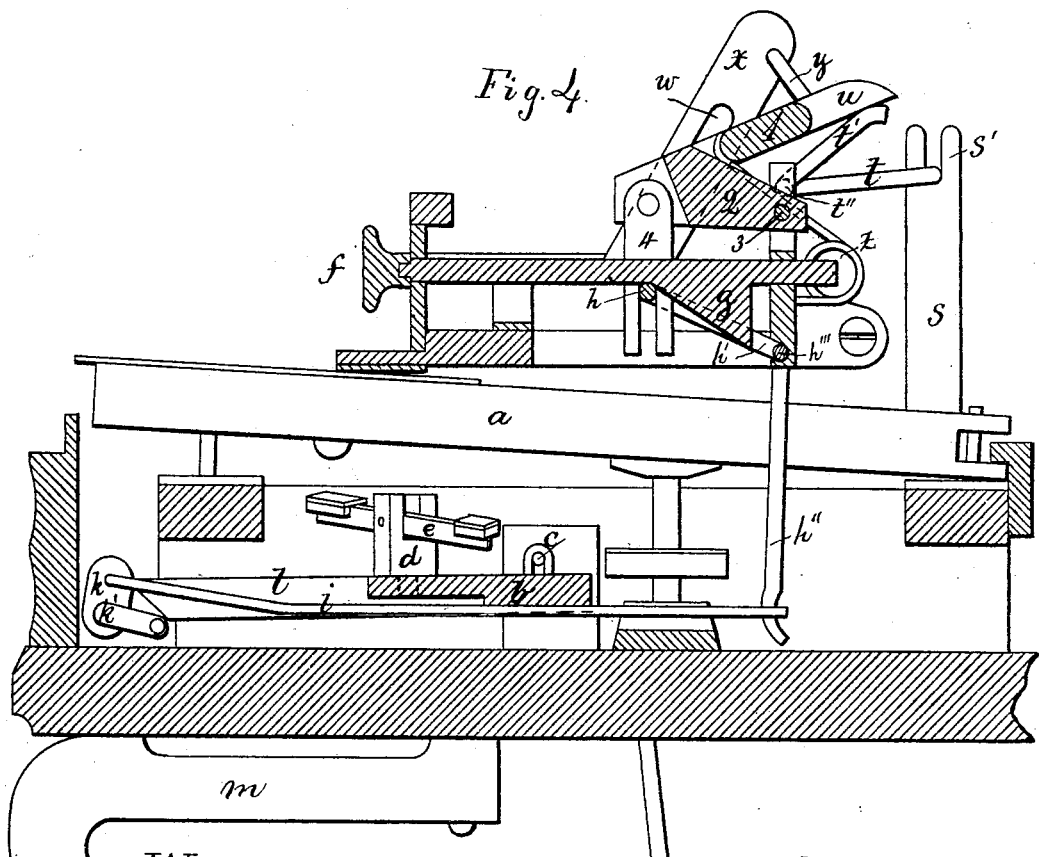

3 Sheets—Sheet 3.

G. WOODS.
REED-ORGAN ACTIONS.

No. 190,698. Patented May 15, 1877.

Witnesses:
Henry Chadbourn.
F. Allen.

Inventor:
George Woods,
by
Alban Andren,
his atty.

UNITED STATES PATENT OFFICE.

GEORGE WOODS, OF CAMBRIDGEPORT, MASSACHUSETTS.

IMPROVEMENT IN REED-ORGAN ACTIONS.

Specification forming part of Letters Patent No. 190,698, dated May 15, 1877; application filed September 2, 1876.

*To all whom it may concern:*

Be it known that I, GEORGE WOODS, of Cambridgeport, in the county of Middlesex and State of Massachusetts, have invented certain new and useful Improvements in Parlor-Organs; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates to improvements in octave-couplers for parlor-organs; and consists in the combination of a pair of levers for each octave with forked bearings or fulcrums secured to the adjustable lever-board, constructed and arranged as hereinafter set forth. The said levers are operated by an incline on the stop and suitable connections for raising and lowering the coupler-board, as will hereinafter be more fully shown and described.

My invention also relates to an improved full-organ stop for organs, operated by knee-pressure on a lever beneath the reed-board, and suitable connections to an oscillating bar, the ends of which are provided with a toggle-joint and projections playing through holes in stationary guides or frames, by which arrangement all the stops, or as many as are not previously opened, can be simultaneously operated with ease, and in such a manner that the stops can be held by the operator in an open position without much pressure, owing to the peculiarity of the toggle-joint and its connecting rocker-bar, as will now be herein more fully shown and described.

Figure 1:
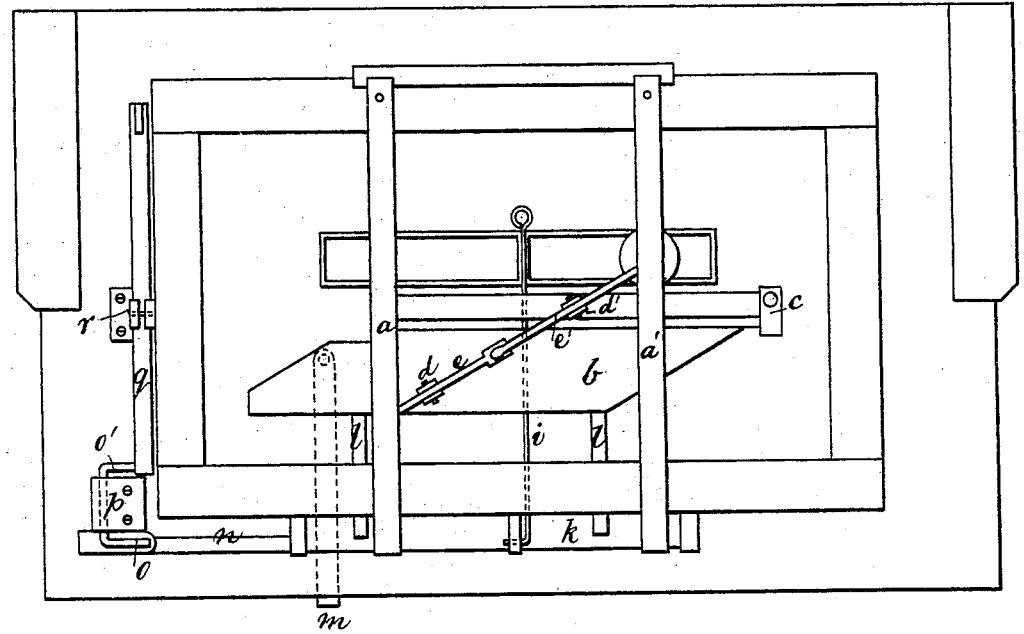
Figure 2:
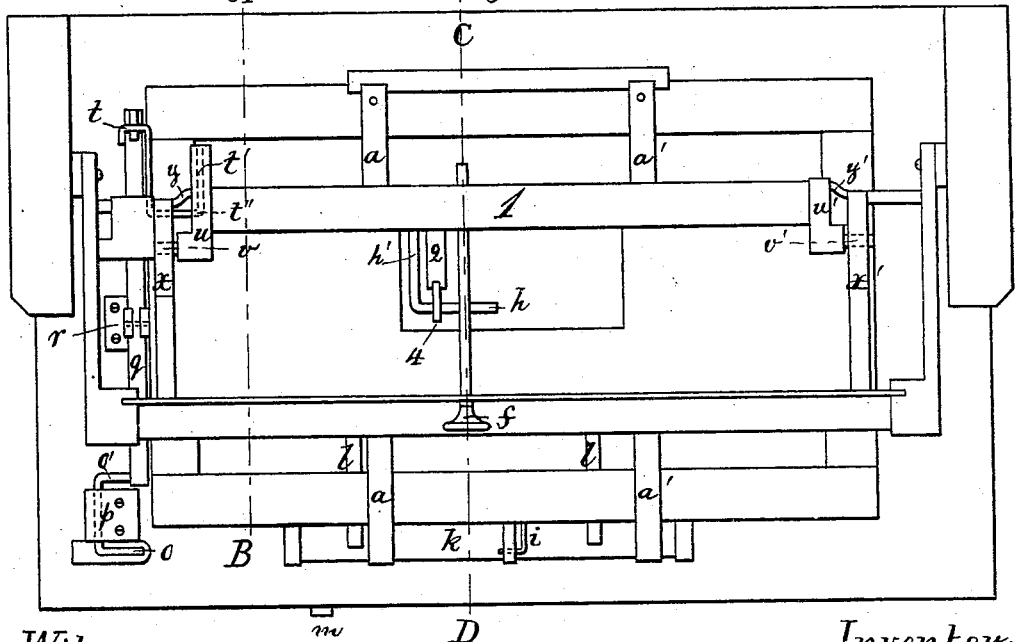
Figure 5:
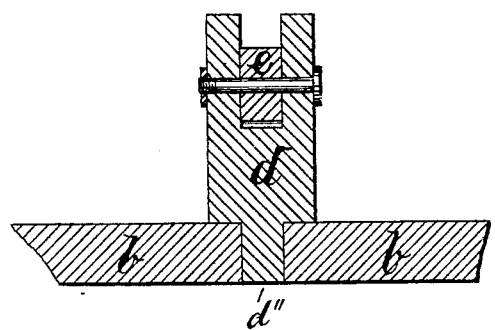
Figure 6:
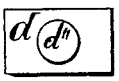
Figure 7:
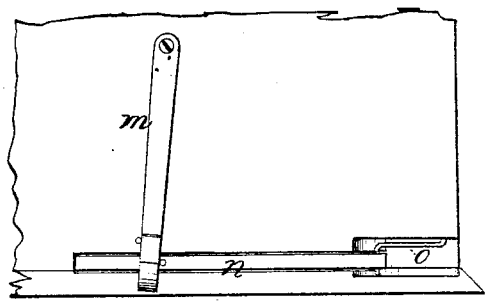

On the accompanying drawings, Figure 1 represents a plan view of the octave-coupler, and Fig. 2 represents a similar plan view of the full-stop arrangement. Fig. 3 represents a cross-section on the line A B, shown in Fig. 2; and Fig. 4 represents a cross-section on the line C D, also shown in Fig. 2. Fig. 5 represents a longitudinal section for the forked bearing for the octave-coupler levers, and Fig. 6 represents a bottom view of the same. Fig. 7 represents a detail plan view of the under side of the knee-lever $m$ and its link $n$, hereinafter described.

Similar letters refer to similar parts wherever they occur on the different parts of the drawings.

$a$ $a'$ represent keys, one of which is an octave below the other. $b$ represents the coupler-board, movable on the fulcrum $c$. To the coupler-board $b$ are secured forked bearings $d$ $d'$, in which the levers $e$ $e'$ are hung and supported. The coupler-board $b$ is raised on its fulcrum, so as to couple one key with its octave, by means of the levers $e$ $e'$. This is accomplished by means of the octave-stop $f$, provided with an incline, $g$, as shown in Fig. 4, acting on a pin, $h$, made in one piece with the arms $h'$ $h''$, that are made to rock on the fulcrum $h'''$. To the lower end of the arm $h''$ is connected a rod, $i$, by which the rocker-bar $k$ is operated around its fulcrum $k'$, thereby acting on the projecting levers $l$ $l$, that are attached to the coupler-board $b$, and in this manner the latter is raised as soon as the octave-stop $f$ is pulled out. The forked bearings $d$ $d'$ are a great improvement upon the ordinary solid bearings, formerly made in one piece with the coupler-board, as the former can be adjusted to a proper position and repaired very easily if damaged. The forked bearings are each provided for this purpose with a circular projection, $d''$, on their under side, which projection is inserted and secured in a circular hole made through the coupler-board $b$, as shown in Figs. 5 and 6.

The full-organ stop is constructed and operated as follows: Beneath the reed-board is located the lever $m$, that is operated by knee-pressure, in the usual manner. The lever $m$ is connected, by means of the link $n$, to the double crank $o$ $o'$, movable in the bearing $p$. The crank $o'$ is jointed to the rocking lever $q$, movable on the fucrum $r$. The rear end of the lever $q$ is jointed to the vertical link $s$, the upper end $s'$ of which is forked, as shown in Figs. 3 and 4. In the forked end $s'$ rests one end of the double-crank wire $t$ $t'$, movable on the fulcrum $t''$, as shown in Figs. 3 and 4. The wire $t'$ operates upon a lever, $u$, that is provided in its forward end with a pin or stud, $v$, that plays in a slotted opening, $w$, in the stationary support $x$. The lever $u$ is, furthermore, hinged to the upper part of the support $x$ by means of the movable link $y$, thus forming a toggle-joint, $u\ v\ w\ y$. A spring, $z$, forces the stud or pin $v$ upward in the slot-hole $w$ as soon as the pressure on the knee-lever $m$ is removed.

A cross-bar, 1, going from end to end of the key-board, connects the lever $u$ with a similar one, $u'$, in the opposite end of the instrument, which lever is, in a similar manner, provided with a stud, $v'$, slot-hole $w'$, stationary support $x'$, and link $y'$. The bar 1 acts upon the lever 2 (one for each stop) as soon as the knee-lever $m$ is operated. The lever 2 is jointed to a stationary support at 3, around which it is made to turn, and in its free forward end it is jointed to a vertical link, 4, that is forked in its lower end, and embraces the pin $h$, that is arranged in connection with each respective stop. Thus it will be seen that any number of stops can be instantaneously operated by means of the knee-lever $m$ and its connecting mechanism to the cross-bar 1, although each stop may be independently operated from its fellow when so required.

The advantage of the toggle-joint $u\ v\ w\ y$, herein described, is, that very little pressure is required on the knee-lever $m$ to hold the stops in their positions after they are opened, as compared with the ordinary arrangement now used on organs.

Having thus fully described the nature, construction, and operation of my invention, I wish to secure by Letters Patent, and claim—

1. In combination with the coupler-levers $e$ $e'$ and the keys $a\ a'$, the forked bearings $d\ d'$, provided with the circular projection $d''$, and secured to the coupler-board $b$, substantially as and for the purpose described.

2. The combination of the cross-bar 1, the toggle-joint $t\ u\ v\ w\ y$, and its connecting mechanism with the knee-pedal $m$, as and for the purpose herein shown and described.

In testimony that I claim the foregoing as my own invention I have affixed my signature in presence of two witnesses.

GEORGE WOODS.

Witnesses:
ALBAN ANDRÉN,
CARL FOGELBERG.